(12) United States Patent
Pinot et al.

(10) Patent No.: US 10,456,868 B2
(45) Date of Patent: Oct. 29, 2019

(54) PROCESSING SYSTEM FOR MULTIPLE DIFFERING WORKPIECES

(71) Applicant: Trodat GmbH, Wels (AT)

(72) Inventors: Jean-Philippe Pinot, Wels (AT); Stéphanie Verrier, Wels (AT)

(73) Assignee: Trodat GmbH, Wels (AT)

( * ) Notice: Subject to any disclaimer, the term of this patent is extended or adjusted under 35 U.S.C. 154(b) by 216 days.

(21) Appl. No.: 15/110,610

(22) PCT Filed: Jan. 7, 2015

(86) PCT No.: PCT/AT2015/050003
§ 371 (c)(1),
(2) Date: Jul. 8, 2016

(87) PCT Pub. No.: WO2015/103654
PCT Pub. Date: Jul. 16, 2015

(65) Prior Publication Data
US 2016/0325381 A1     Nov. 10, 2016

(30) Foreign Application Priority Data
Jan. 10, 2014  (AT) .................................. 50017/2014

(51) Int. Cl.
*B23K 26/362*     (2014.01)
*B23K 26/70*      (2014.01)
(Continued)

(52) U.S. Cl.
CPC .......... *B23K 26/362* (2013.01); *B23K 26/032* (2013.01); *B23K 26/352* (2015.10);
(Continued)

(58) Field of Classification Search
CPC .. B23K 26/362; B23K 26/702; B23K 26/032; G06F 3/04; G05B 15/02; G06T 7/00; G06K 19/06
(Continued)

(56) References Cited

U.S. PATENT DOCUMENTS 454,499 A    6/1891  Ryer
973,556 A   10/1910  Peterson
(Continued)

FOREIGN PATENT DOCUMENTS

AT          501318       11/2006
AT       A50017/2014      1/2014
(Continued)

OTHER PUBLICATIONS

NPL06—Amazon. <URL: https://www.amazon.com/dp/B01MQDH576?psc=1.> Nov. 3, 2016. Self-inking stamp.
(Continued)

*Primary Examiner* — Samuel M Heinrich
(74) *Attorney, Agent, or Firm* — Meyertons, Hood, Kivlin, Kowert & Goetzel, P.C.

(57) ABSTRACT

In some embodiments, a processing system and a method for operating the processing system may include at least one processing area, one control area, one input area and optionally one receiving area and/or one presentation area. Via an input and/or display element, a user can enter a text and/or graphics in an operating software installed therein, which can be passed to a control software running in the control area. Into the input area and/or the control area a database is integrated, in which the data of the blanks or workpieces to be processed are stored.

21 Claims, 3 Drawing Sheets

(51) Int. Cl.

| | | |
|---|---|---|
| *B23K 26/03* | (2006.01) | |
| *G05B 15/02* | (2006.01) | |
| *G06T 7/00* | (2017.01) | |
| *G06K 19/06* | (2006.01) | |
| *B41K 1/36* | (2006.01) | |
| *B41K 1/38* | (2006.01) | |
| *B41D 7/00* | (2006.01) | |
| *B23K 37/02* | (2006.01) | |
| *B23K 26/38* | (2014.01) | |
| *G06F 3/0482* | (2013.01) | |
| *G06F 3/0484* | (2013.01) | |
| *B23K 26/361* | (2014.01) | |
| *B23K 26/352* | (2014.01) | |
| *B23K 101/00* | (2006.01) | |
| *B23K 101/34* | (2006.01) | |

(52) U.S. Cl.
CPC ............ *B23K 26/361* (2015.10); *B23K 26/38* (2013.01); *B23K 26/702* (2015.10); *B23K 37/0294* (2013.01); *B41D 7/00* (2013.01); *B41K 1/36* (2013.01); *B41K 1/38* (2013.01); *G05B 15/02* (2013.01); *G06F 3/0482* (2013.01); *G06F 3/04847* (2013.01); *G06K 19/06028* (2013.01); *G06T 7/001* (2013.01); *B23K 2101/007* (2018.08); *B23K 2101/35* (2018.08)

(58) Field of Classification Search
USPC .......................... 219/121.6, 121.85; 700/166
See application file for complete search history.

(56) References Cited

U.S. PATENT DOCUMENTS

| | | | |
|---|---|---|---|
| D331,418 S | 12/1992 | Winston | |
| D359,504 S | 6/1995 | Stefanski | |
| D367,879 S | 3/1996 | Smith | |
| D387,800 S | 12/1997 | Daw | |
| D389,175 S | 1/1998 | Imamaki | |
| 5,727,467 A | 3/1998 | Skopek | |
| 5,768,992 A | 6/1998 | Daw et al. | |
| D400,566 S | 11/1998 | Schreiberhuber | |
| 5,850,787 A | 12/1998 | Daw | |
| 5,971,130 A * | 10/1999 | Nakamura | G06K 1/04 |
| | | | 198/340 |
| D417,464 S | 12/1999 | Skopek | |
| 6,067,905 A | 5/2000 | Faber | |
| D451,944 S | 12/2001 | Lipkin | |
| 6,732,649 B1 | 5/2004 | Wall et al. | |
| 6,813,999 B2 | 11/2004 | Treml | |
| 6,834,584 B1 | 12/2004 | MacNeil | |
| 6,892,638 B2 | 5/2005 | Sculler | |
| 7,069,852 B2 | 7/2006 | Zindl | |
| D538,328 S | 3/2007 | Faber | |
| D540,848 S | 4/2007 | Faber | |
| D542,335 S | 5/2007 | Faber | |
| D542,835 S | 5/2007 | Faber | |
| 7,389,727 B2 | 6/2008 | Faber | |
| D588,187 S | 3/2009 | Shih | |
| 7,520,221 B2 | 4/2009 | Ameshofer | |
| D618,274 S | 6/2010 | Faber | |
| 7,743,703 B2 | 6/2010 | Ameshofer | |
| 7,853,353 B1 | 12/2010 | Hagen et al. | |
| 7,877,909 B1 | 2/2011 | Hagen et al. | |
| 7,894,935 B1 | 2/2011 | Hagen et al. | |
| D645,121 S | 9/2011 | Fukasawa | |
| 8,050,796 B1 † | 11/2011 | Hagen | |
| D668,714 S | 10/2012 | Zindl | |
| D677,322 S | 3/2013 | Zindl | |
| 8,402,890 B2 | 3/2013 | Faber | |
| 8,408,126 B2 | 4/2013 | Faber | |
| 8,413,357 B1 | 4/2013 | Hagen et al. | |
| 9,227,450 B2 | 1/2016 | Faber | |
| 9,354,630 B2 † | 5/2016 | Sukhman | |
| 9,475,326 B2 | 10/2016 | Petersen | |
| D803,307 S | 11/2017 | Riegler et al. | |
| 9,895,919 B2 | 2/2018 | Zehetner et al. | |
| D820,350 S | 6/2018 | Riegler et al. | |
| D823,378 S | 7/2018 | Riegler et al. | |
| 2001/0049669 A1 | 12/2001 | Ito et al. | |
| 2003/0150343 A1 | 8/2003 | Koneczny | |
| 2005/0066828 A1 | 3/2005 | Wei | |
| 2006/0000374 A1 | 1/2006 | Faber | |
| 2006/0162596 A1 | 7/2006 | Faber | |
| 2006/0185539 A1 | 8/2006 | Faber | |
| 2007/0272099 A1 | 11/2007 | Pointl | |
| 2008/0087180 A1 | 4/2008 | Ameshofer | |
| 2009/0255427 A1 | 10/2009 | Faber | |
| 2009/0301327 A1 | 12/2009 | Nelson | |
| 2010/0031835 A1 | 2/2010 | Faber | |
| 2010/0263561 A1 | 10/2010 | Faber | |
| 2011/0277647 A1 | 11/2011 | Zindl | |
| 2011/0313561 A1* | 12/2011 | Lee ........................ G06T 7/0004 |
| | | | 700/166 |
| 2013/0291744 A1 | 11/2013 | Anthony | |
| 2015/0181033 A1 | 6/2015 | Keller | |
| 2016/0325381 A1 | 11/2016 | Pinot et al. | |
| 2016/0361934 A1 | 12/2016 | Riegler et al. | |
| 2016/0361935 A1 | 12/2016 | Sillipp et al. | |
| 2016/0361936 A1 | 12/2016 | Zehetner et al. | |
| 2016/0368297 A1 | 12/2016 | Scharinger et al. | |

FOREIGN PATENT DOCUMENTS

| | | |
|---|---|---|
| AT | A50473/2015 | 6/2015 |
| AT | A50474/2015 | 6/2015 |
| AT | A50475/2015 | 6/2015 |
| AT | A50478/2015 | 6/2015 |
| CA | 2717256 | 11/2011 |
| CN | 301153224 | 3/2010 |
| CN | 304057436 | 2/2017 |
| CN | 304057437 | 2/2017 |
| DE | 202010007577 U | 8/2010 |
| EM | 001922865-0001 | 2/2012 |
| EM | 002716431-0001 | 1/2017 |
| EM | 002716431-0011 | 1/2017 |
| EM | 002904854-0007 | 1/2017 |
| EP | 0459969 | 12/1991 |
| EP | 0804344 B1 | 9/1998 |
| EP | 2384283 B1 | 11/2011 |
| EP | 2591921 B1 | 5/2013 |
| EP | 2594406 | 5/2013 |
| JP | D1546014 | 3/2016 |
| WO | 1999064246 | 12/1999 |
| WO | 2004085110 | 10/2004 |
| WO | 2006029422 | 3/2006 |
| WO | 2006079129 | 8/2006 |
| WO | 2006079131 | 8/2006 |
| WO | 2010085828 | 8/2010 |
| WO | 2011056345 | 5/2011 |
| WO | 2011151604 | 12/2011 |
| WO | 2014113833 | 7/2014 |
| WO | 2014/172738 A1 | 10/2014 |
| WO | 2014172738 | 10/2014 |
| WO | 2015103654 | 7/2015 |
| WO | 2016/197172 | 12/2016 |
| WO | 2016197170 | 12/2016 |
| WO | 2016197171 | 12/2016 |
| WO | 2016197173 | 12/2016 |

OTHER PUBLICATIONS

NPL07—Amazon. <URL: http://a.co/3GHpXYC.> Feb. 12, 2013. Self-inking stamp.

NPL08—Amazon. <URL: https://www.amazon.com/Replacement-TRODAT-Printy-I nkinguStamps/dp/B00FB70JEO/ref=sr_ 1_ 1 ?ie=UTF8&qid=1496770907&sr=8-1 &keywords=Replacement+Ink+Pad.> Feb. 11, 2012. Replacement Ink Pad.

NPL09_Universal Laser Systems, Inc., "The Turnkey Laser Personalization and Identification Program," 2000.

(56) References Cited

OTHER PUBLICATIONS

Notice of Allowance for U.S. Appl. No. 29/567,664 dated Jul. 12, 2017.
Non Final Office Action for U.S. Appl. No. 29/567,665 dated Jun. 29, 2017.
Non Final Office Action for U.S. Appl. No. 29/567,666 dated Jun. 30, 2017.
Non Final Office Action for U.S. Appl. No. 15/177,072 dated Mar. 27, 2017.
Non Final Office Action for U.S. Appl. No. 15/177,078 dated Mar. 31, 2017.
Non Final Office Action for U.S. Appl. No. 15/177,091 dated Mar. 31, 2017.
Advisory Action for U.S. Appl. No. 29/567,666 dated May 29, 2018.
Non Final Office Action for U.S. Appl. No. 15/177,072 dated Apr. 6, 2018.
Non Final Office Action for U.S. Appl. No. 15/177,078 dated Jun. 14, 2018.
NPL10—Communication for U.S. Appl. No. 29/567,665 faxed on Jan. 3, 2018.
Final Office Action for U.S. Appl. No. 15/177,072 dated Oct. 11, 2017.
Advisory Action for U.S. Appl. No. 15/177,072 dated Dec. 27, 2017.
Final Office Action for U.S. Appl. No. 15/177,078 dated Oct. 20, 2017.
Notice of Allowance for U.S. Appl. No. 15/177,100 dated Oct. 19, 2017.
Final Office Action for U.S. Appl. No. 15/177,091 dated Oct. 5, 2017.
Notice of Allowance for U.S. Appl. No. 29/548,144 dated Mar. 19, 2018.
Notice of Allowance for U.S. Appl. No. 29/567,665 dated Mar. 19, 2018.
Final Office Action for U.S. Appl. No. 29/567,666 dated Feb. 26, 2018.
Advisory Action for U.S. Appl. No. 15/177,078 dated Feb. 21, 2018.
Advisory Office Action for U.S. Appl. No. 15/177,091 dated Jan. 19, 2018.
Non Final Office Action for U.S. Appl. No. 15/177,091 dated Mar. 27, 2018.
Co-Pending Design U.S. Appl. No. 29/548,144 entitled, "Hand Stamp" to Riegler et al. filed Dec. 10, 2015.
Co-Pending Design U.S. Appl. No. 29/567,664 entitled, "Hand Stamp" to Riegler et al. filed Jun. 10, 2016.
Co-Pending Design U.S. Appl. No. 29/567,665 entitled, "Stamp Pad" to Riegler et al. filed Jun. 10, 2016.
Co-Pending Design U.S. Appl. No. 29/567,666 entitled, "Hand Stamp" to Riegler et al., filed Jun. 10, 2016.
NPL02—Registered Community Design No. 002716431, registered Community design for hand stamp and pad, Jun. 10, 2015, 86 pages.
NPL03—Written Opinion for PCT/AT2015/050003 dated Sep. 11, 2015. (publication No. WO2015103654).
NPL04—International Search Report for PCT/AT2015/050003 dated Dec. 11, 2015. (publication No. WO2015103654).
NPL05—Registered Community Design No. 002904854, registered Community design for hand stamp and pad, Dec. 10, 2015, 23 pages.
Universal Laser Systems, Inc., "The Turnkey Laser Personalization and Identification Program," 2000.†

\* cited by examiner
† cited by third party

PROCESSING SYSTEM FOR MULTIPLE DIFFERING WORKPIECES

PRIORITY CLAIM

This application claims priority to International Application No. PCT/AT2015/050003 entitled "MACHINING SYSTEM FOR A PLURALITY OF DIFFERENT WORKPIECES" filed on Jan. 7, 2015, which claims priority to Austrian Patent Application No. A50017/2014 filed on Jan. 10, 2014, all of which is incorporated by reference herein.

BACKGROUND OF THE INVENTION

1. Field of the Invention

The present disclosure generally relates to a processing system and to a method for operating a processing system.

2. Description of the Relevant Art

Systems are known from the prior art with which, by specially trained personnel known as stamp makers, stamp plates or text plates for stamps, in particular hand stamps, are produced. To do this, specialist personnel design on a computer, with the aid of standardised software, in particular CorelDraw®, MS Word®, etc., a stamp image using graphics and/or texts according to the customer's wishes. The data are then transferred to a processing device, in particular a laser plotter, or a control device for the same, whereupon a conversion of the data takes place, preferably with the aid of stored data and/or tables. The specialist personnel then insert a workpiece, in particular what is referred to as a blank, which is formed from flexible rubber, into the processing device, whereupon manual and/or automatic positioning of the processing device, in particular of a beam source of a laser, takes place. The specialist personnel then start the processing procedure, such that a negative image of the stamp created by the specialist personnel on the computer is produced on the blank. Once the processing procedure has been completed, the specialist personnel remove the blank and clean it of the processing residues. Subsequently, the negative stamp imprint is applied to the printing plate carrier on which already an adhesive layer is provided. The disadvantage here is that in such an approach, the customer cannot take away the stamp directly but only later, or have it sent to him/her. In addition, the customer cannot exert any influence in the creation of the stamp impression either, as the same is prepared by specialists and not directly by the customer.

From WO 2011/151604 A, a processing system for the engraving of followers, especially pendants, is known. Here, a hand-written text or graphics is produced by a stylus on a processing device connected to the input device, which is then transmitted to a computer. The computer then controls to the processing unit, into which the pendant is loaded, engraving the handwritten text or graphic produced into the pendant. The disadvantage here is that only a single processing operation, especially for the engraving of pendants, can be performed with the system.

Furthermore, a processing system is known from the prior art, especially from U.S. Pat. Nos. 7,853,353, 7,877,909, 7,894,935, 8,050,796 and 8,413,357, in which above the processing area an input and display element attached thereto is arranged, via which a user can make his or her input for engraving a pendant, in particular a heart-shaped pendant. Furthermore, the processing system comprises a movable receptacle in the processing area, into which the pendant is positioned. To this end, the receptacle is moved into a loading position, in which the receptacle partially protrudes from the housing of the processing system, so that the pendant can be inserted into the receptacle. Then, the receptacle is moved into the processing position below the input and display element for processing. After completion of the engraving, the receptacle is in turn moved into a position to allow withdrawal of the pendant. The disadvantage here is that for a single processing operation, namely the engraving of a pendant, a very high effort is required.

U.S. Pat. No. 6,732,649 B1 discloses a method for producing a stamp plate, wherein via the processing device the data for the stamp plates are entered, and subsequently a photopolymer stamp plate is exposed. The disadvantage of such systems is that only one task, namely the production of a photopolymer stamp plate, can be performed with the processing device.

Accordingly, there is a desire to provide a processing system and a method in which the user-friendliness is substantially increased.

SUMMARY

The object of the invention is to provide a processing system and a method in which the user-friendliness is substantially increased. At the same time, the maintenance effort of the equipment or system is to be kept as low as possible. A further objective is to obviate as far as possible the disadvantages inherent in the prior art.

The object of the invention is achieved by a processing system in which into the input area and/or the control area a database is integrated, in which data of the workpieces or blanks to be processed are stored.

The advantage here is that thereby a wide variety of products or workpieces can be selected, and thus a significant improvement in quality is achieved with as few prompts for input as possible, i.e., thanks to the database already a lot of information and data for the individual products are stored, so that the user only has to enter his/her text and/or graphics. Thereby input errors are reduced, as the user does not need to know about the quality of the product, for example the material to be used, to achieve best possible processing quality. Specifically, the advantage of using a database has shown when as a processing device a laser plotter with several, in particular two different radiation sources is used, as for the differently stored materials of the products the matching laser can be used without requiring additional input from the user or operator. Thus, the user-friendliness of such a processing system is significantly simplified and enhanced. Such an embodiment is particularly advantageous if the system is designed for several differing products or workpieces, so that a very large number of products or workpieces to be processed are present, whose data must be managed accordingly.

In one embodiment, where as data a workpiece designation or a type designation, a length, width and height of the workpiece, a graphical representation of the workpiece, a material of the workpiece, a code, in particular a bar code or QR code, etc., are stored, it is advantageous that thereby the input prompt for the processing operation can be reduced and thus only the text or graphics still need to be entered. In such processing systems, however, it is possible that after selection of a product or workpiece the stored data for the required processing operation can be modified. A permanent change or storage in the database, however, can be performed only by the technical staff or an operator.

In another advantageous embodiment, the workpiece or the blank is selected from the database via the operating software or can be loaded into the operating software, as this enables the user to access all the products unhurriedly via the preferably detachable input device or display element.

In an advantageous embodiment, the control area and/or input area is designed for automatic identification of the workpiece stored in the database by detection of the workpiece, since this in turn can avoid input errors caused by incorrect selection of the product. This increases the user-friendliness of the system substantially.

By a design in which the automatic identification of the workpiece takes place based on detection of the length, width and height of the same, simple and inexpensive identification is achieved in an advantageous manner. However, for such an identification to be implemented, it is necessary that the user at least specifies or selects a product group of the workpiece to be processed, or selects the appropriate product from a product list matching these values, if multiple matches exist.

In the embodiment in which for the automatic identification of the workpiece a camera for imaging the working area or the workpiece is provided, thereby in an advantageous manner a graphic analysis is made possible, so that the number of different but matching products is greatly reduced, or the product can be assigned accurately, respectively. This also makes it possible to show the actual product to the user on a display. Thus, the user can also perform a visual comparison with stored products and select the desired product, if no matching was possible by detection.

In another advantageous embodiment for the differently stored workpieces at least one or more processing areas are defined and stored, which can be selected via the operating software, as this prevents destruction caused by incorrect processing of the product. This provides substantial relief for the user, since the products often comprise labels, logos or protective covers, where processing is not expedient or leads to destruction of the functionality, e.g. engraving on a protective cover for a camera of a mobile phone case. This can ensure that the user can perform a processing operation only in those areas where no impairment or damage to the product can be caused.

Furthermore, the objective of the invention is achieved by a processing system in which a connection system for connecting the processing system, in particular the individual area, with a superordinate network, particularly an internet, is provided, and the connecting system is designed for transmitting and receiving data.

The advantage here is that this permits data exchange with external devices or other processing system in an easy manner. Thus, it is possible that via the superordinate network maintenance work can be performed without requiring qualified staff to be on site. Another important advantage is that via this data connection new products or software can be sent to all processing systems, so that the systems are always up to date. This is advantageous in particular if the systems are equipped with a database for the workpieces, since the database can be updated via remote maintenance. Thus, the latest products for selecting are quickly available to the shops and department stores. Easy analysis or troubleshooting in case of malfunctions of the system is likewise externally possible.

In one embodiment, in which the connection system for transmitting and receiving data, in particular of workpiece data, software updates, etc. is provided, it is advantageous that the latest products and updates are available in a very short time. Thus, it is no longer necessary to have qualified staff import the data into the processing system on site; hence, considerable cost savings are achieved.

In another advantageous embodiment, the connection system is integrated into the communication system, as this permits use of standardised systems such as internet sticks, WLAN sticks, etc.

The invention is also achieved, however, by a processing system in which a reading system is provided for identification of the workpiece using a code attached to the workpiece, and the data stored for this workpiece are accessible via an operating software on an input device or display element.

The advantage here is that thereby incorrect entries during the selection of products are prevented, because to each product a unique code is assigned. Concomitantly, this code can be used for further information and systems, in particular price management, inventory management, etc., so that the code is passed accordingly. This also allows simplified management. The essential advantage, however, lies in the fact that with such an equipment of the processing system the user does not need to make any entries in relation to the product, but merely needs to scan the code with a suitable device, whereupon all required data are loaded automatically.

It is also advantageous if the code is formed by a bar code or a QR code, as this allows utilisation of commercially available systems, which are used also by other applications, such as warehouse management, the accounting system, etc. Thus, only a single code needs to be provided on or pasted onto the product, which can then be used for all systems throughout the shop or department store.

In another advantageous embodiment, the code is detected or detectable via a scanner or a camera on the input or display element, for example, by an installed app on the same, as this permits use of commercially available equipment or system, whereby the cost can be reduced. Such integration of a system known from the prior art also enables use of a code for other systems.

Furthermore, the objective of the invention is achieved by a processing system in which the display element is equipped with a connection system for data exchange with a further connection system in the processing system, wherein the location-independent display element automatically proposes or selects, respectively, the connection to the nearest processing system.

The advantage here is that thereby such a processing operation can be offered in smaller shops or stores as well, without the processing system itself being set up on site. Via the display element, the user can select the product and enter his/her processing operation, in particular the text and/or graphics for engraving on a product or creating a stamp plate, on the locally present display element, after which the data are transmitted to an external processing system. Preferably, the user can select the locations of the preferably nearest processing systems from a selection list, so on his/her way home the user can drop in at such a site after his/her completed purchase and pick up the product. It is also possible that a plurality of input devices or display elements thus equipped on a single processing system send the external processing operations.

Also of advantage is an embodiment in which in the operating software a selection list of the nearby processing systems is accessible or displayed, and the degree of utilisation and processing time for performing a processing operation and/or the distance to the location of the display element are shown, since thereby the best location for the user to pick up his/her product can be selected. At the same time, the user can plan his/her route, since the estimated pick-up time is displayed, so that further purchases can be made if so desired.

In an advantageous embodiment, in addition to the display of the distance to the location of the display element and the processing time or degree of utilisation, a description of the route to the processing system selected from the list can be shown and printed out via the communication system, allowing the user to obtain directions if he/she does not know the location of the selected processing system.

The objective of the invention is also achieved by a method for operating a processing system in which in the processing system, in particular in an input area and/or the control area, a database is operated in which data of the workpieces or blanks to be processed are stored, where via a connection system the processing system, in particular the individual area, is connected to a superordinate network, particularly an internet, for transmitting and receiving data.

The advantage here is that thus a very simple operation of the system can be performed by a user. At the same time, the source of errors of wrong entries is greatly reduced, since the user now only needs to select the right product. Connection to a superordinate network, especially the internet, also allows cost-effective remote maintenance to be performed. In addition, very swift data exchange is possible, so the individual systems may be maintained at the latest state. In particular, the use of the database in which the products are stored makes it necessary that the data of new products are updated as soon as possible at each system, which is easily possible via the internet.

In further advantageous embodiments, identification of the workpiece is carried out via a reading system, where the reading system detects a code attached to the workpiece, whereupon the data stored for this workpiece are loaded into the operating software at the input device or display element, respectively, since this achieves further simplification of the user-friendliness of the processing system.

Moreover, the objective of the invention is achieved by a further method of operating a processing system, in which the data transmission from the operating software to the control software takes place at the input and/or display element via a superordinate network, in particular via an internet connection, wherein the location-independent display element automatically proposes or selects the connection with the nearest processing system.

The advantage here is that preferably in smaller shops or department stores a processing operation with a remote processing system can be offered, and the customer can then pick up the product at another location. Thus at low cost great coverage for the customer can be achieved, since only the input device or display element with the operating software running on it is required.

Another advantageous embodiment comprises measures where during or after the data transmission a time of completion of the product or workpiece is displayed for picking up in the operating software, so that it is ensured that the user does not [attempt to] pick up the product too early. The customer can thus plan his/her route or purchases accordingly and does not have to wait for the completion of the workpiece.

Finally, another advantageous embodiment comprises measures where in the operating software a selection list of nearby processing systems and their degree of utilisation and processing time for performing a processing and/or the distance to the location of the display element are displayed, enabling the user to easily plan his/her further route. At the same time, he/she can choose the location for a processing system that is optimal for him/her.

BRIEF DESCRIPTION OF THE DRAWINGS

The invention is described hereinafter in the form of exemplary embodiments, wherein attention is drawn to the fact that the invention is not limited to the exemplary embodiments or solutions represented and described.

The figures show.

DETAILED DESCRIPTION

It should be stated by way of introduction that, in the individual embodiments, the same parts are provided with the same reference numbers or same component designations, wherein the disclosures contained in the entire description can, by analogy, be transferred to identical parts with identical reference numbers or identical component designations. The position details selected in the description, such as, e.g., top, bottom, lateral, etc., relate to the figure described, and in the event of a change of position, they are to be transferred to the new position by analogy.

Individual features or feature combinations from the exemplary embodiments shown and described may also represent independent inventive solutions.

FIGS. 1 to 4 show a processing system 1 or processing device 1 with various components or assemblies.

Figure 1:
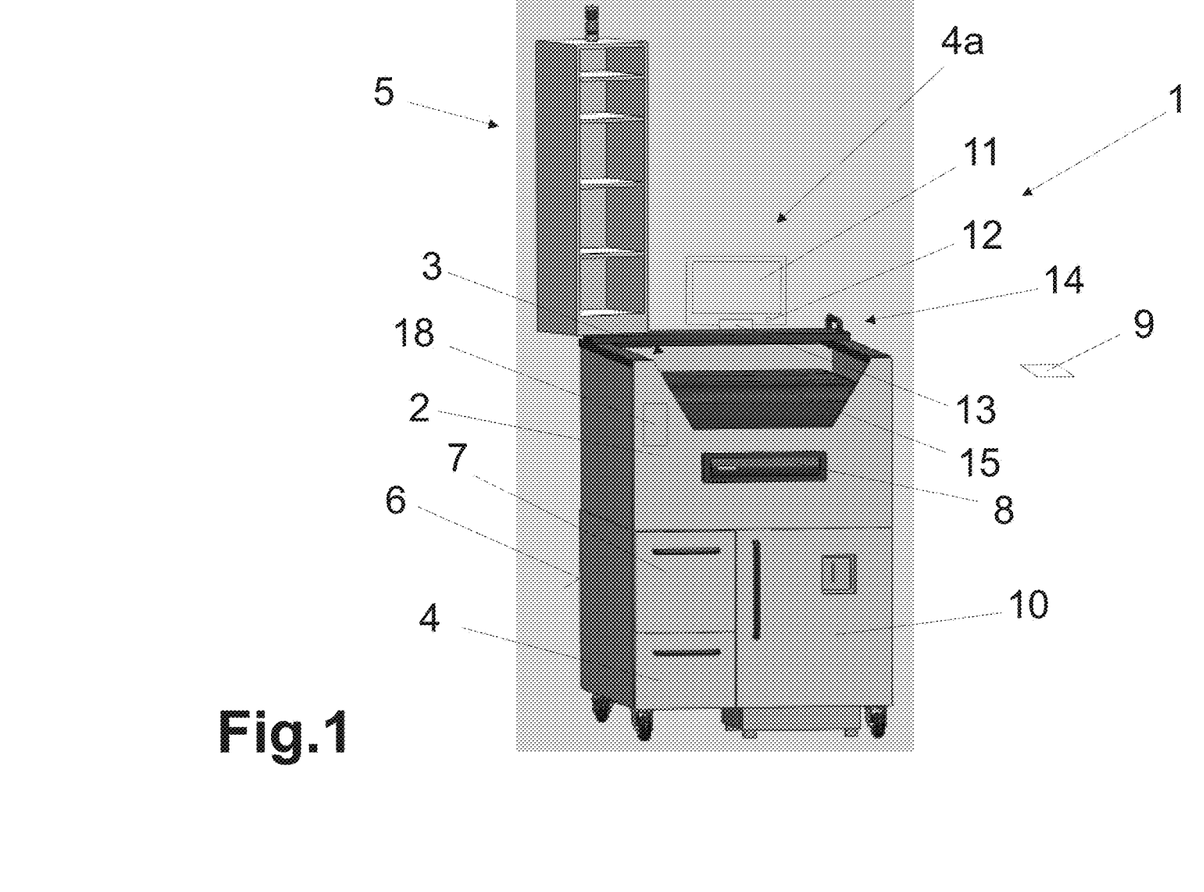
FIG. 1 a summary diagram of a processing system for the processing of workpieces and production of text plates for stamps.

The processing system 1 according to FIG. 1 comprises a housing 2, into which the individual components are integrated. The processing system 1 comprises at least one processing area 3, a control area 4, an input area 4a and optionally a receiving area 5 and/or presentation area 5. Here it is pointed out that the individual arrangements of the components in housing 2 are not limited to the illustration, but the components can be arranged accordingly at other locations in the housing.

The housing 2 is preferably made of metal, particularly sheet metal, and comprises a plurality of doors, so that easy accessibility of the components disposed behind it is possible. Preferably in the rear region, in particular on the backside, a power supply unit 6 is provided, from which the individual components can be supplied with energy. The power supply unit 6 is connected via a connection cable (not shown) to a public electricity supply network (not shown). It is also possible that in the power supply unit 6 an emergency power system (not shown) is integrated, which is preferably automatically activated when the public power supply no longer supplies power. This ensures that during a power failure at least for a certain period the processing system 1 or at least the essential elements are still energised, so that settings already made, processing operations or the like can be completed and/or stored, respectively.

Furthermore, a communication system 7, in particular a computer, is provided with a printer in the housing 2. The communication system 7 serves to output orders entered by a user and/or to have an optical expression of the input for control, i.e. upon use of the processing system 1 a written confirmation or order can be issued, which the user can use for his/her own purposes, or the user can make a printout of his/her entered data as a preview to be able to edit it in case of dislike before proceeding to implement it. It is also possible that a scanning device is arranged in the communication system 7, via which e.g. the signed confirmation or the order can be scanned. Preferably, the scanning device is, however, used to scan in, e.g., graphics, layout, images, company logos, which can be used for later processing.

It is also possible to couple one or several additional modules (not shown) with components integrated therein to the housing 2 of the processing system. These are preferably attached to the side walls of the housing 2. This allows subsequent extension of the processing system 1. For example, such a module can comprise a scanner that is e.g. is placed on the module or integrated in such a way that it can be easily operated by users from above by opening a cover or lid. It is also possible that such a module is used for the storage of workpieces 9 or paper.

It is also possible that a recycling system 8 is provided in the housing 2 of the processing system 1. The recycling system 2 comprises a receptacle and an insertion opening, through which the remains of a processed workpiece 9 or blank 9 can be thrown in.

Furthermore, into the processing system 1 a cleaning system 10, in particular an extraction system, is integrated, which is activated on the one hand during a processing operation in the processing area 3 and on the other hand after a processing operation for a defined period for cleaning the workpiece 9. The cleaning system 10 is preferably designed such that during a processing operation the air in the region of the workpiece to be processed 9 is extracted, so that upon opening of the processing area there is no odour nuisance for the user or operator. After completion of the processing operation, the cleaning system 10 automatically switches e.g. via a butterfly valve (not shown) to the cleaning function for the user, so that the latter can now clean the workpiece 9 a with a hose (not shown) with a suction brush attached thereto, thus removing the dust particles by aspiration. For avoidance of odour nuisance in the installation area, the cleaning system 10 is equipped with appropriate filters.

It is essential for such a processing system 1 that various workpieces 9 or blanks 9 can be machined or processed with a single device, where the operation of the device and the processing system 1 has been simplified so that merely an operator or customer can work autonomously with the processing system 1. I.e., no qualified personnel is present on site for the processing unit 1, but only a trained operator is, especially a salesperson at a department store. For easy operation, on the processing system 1 a detachable input device 11 or display element 11, respectively, of the input area 4a, on which an operating software, hereinafter also referred to as "Trodesign", is installed, is provided. Into the control area 4 a control software communicating with the operating software, hereinafter also referred to as "JobControl", is integrated, where by connection of the display element 11 to the processing system 1 or by actuating a button 12 on the display element 11 the processing system 1 is connected to this display element 11, i.e., the display element 11 is operated or operable independently of the processing system 1, i.e. with the display element 11 detached, so that work can be done with the operating software installed on the display element 11 and only by deliberate coupling or connecting to the processing system 1 the display element 11 is integrated into the processing system 1. Such a design enables the user to remove the display element 11 from the processing device 1 and make his/her input unhurriedly. Of course, it is possible that the display element 11 can remain positioned at the processing system 1, and input can be made directly. The so-called display element 11 serves as an input device, which preferably has a touch function, i.e., input can be made on the display elements 11 by touching the surface. It is also possible that a plurality of display elements 11 can be used simultaneously, which are operated simultaneously by different users, since the display elements 11 can be operated independently of the processing unit 1.

For the display element 11 a contact device 13 for contacting, in particular for inserting, is provided. The contact device 13 is preferably arranged on a sliding board 14, wherein the sliding board 14 is designed to cover the processing area 3, in particular to cover a portion of the processing area 3. As a safety feature, the sliding board 14 can be equipped with appropriate sensors, so that activation of the processing system 1 is possible only by closing the sliding board 14, whereas during a working process this is interrupted by opening. Of course, it is possible that the power supply, particularly the charging of the display element 11, is done via the contact device 13.

Preferably, the processing system 1 is activated by connecting the display element 11 to the contact device 13 or wirelessly by connecting via actuation of the corresponding button 12 implemented in hardware or software. By connecting, e.g. a data transmission from the operating software to the control software is triggered, so that processing of the data is possible. For this purpose, the processing area 3 is formed by a laser plotter 15. The laser plotter 15 is designed for engraving, marking, cutting and preparing various workpieces 9, particularly of stamp plates or stamp plate blanks 9, signs, mobile phones, tablet computers, pens, sticks, computer accessories such as cases, bags, etc. A single- or multi-beam laser plotter 15 can be used, wherein in case of use of a multi-beam laser plotter 15 for the various materials the individual lasers can be used, i.e. the operator or user already selects, for example, in the operating software the material to be processed, so then the control software activates the corresponding laser source or laser.

To achieve a further user-friendly design of the processing system 1, the processing area 3 of the laser plotter 15 is designed so that in the working area 3 of the laser plotter 15 a processing insert 15a (schematically indicated in FIG. 3) can be inserted or provided. Preferably, the processing insert 15a is designed such that on a processing insert 15a several workpieces 9 or blanks 9 can be positioned, i.e., for example on a processing insert 15a a stamp plate blank 9, a sign (not shown) or an additional element for other workpieces 9, e.g. pens, sticks, etc., can be positioned, so that the processing insert 15a does not need to be exchanged for these different workpieces 9. Such a processing insert 15a can be learned in detail from the parallel Austrian priority application.

As a matter of principle, it can be said that on the input device 11, especially the display element 11, the user creates a desired processing operation via the operating software, whereupon the processing operation is passed to a control device, in particular to a control software, and is converted by the same in such a manner that control of the processing device 1, in particular of the laser plotter 15, is carried out so as to perform the desired processing operation, after which the workpiece 9 is positioned in the processing device 1, in particular on a processing insert 15a, and the processing operation can be started.

Figure 2:
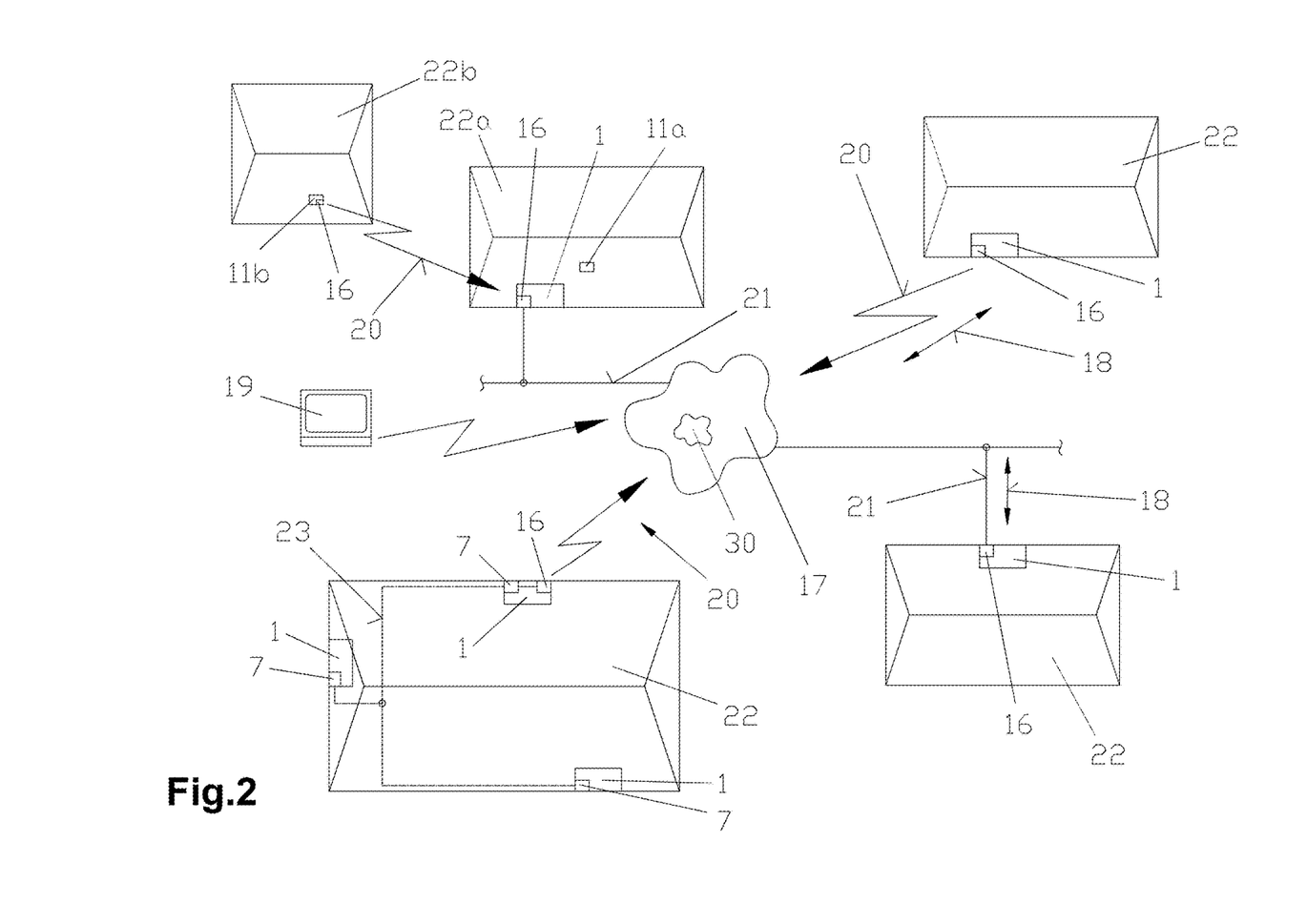
FIG. 2 schematic representation of several processing systems at different sites.

To enable the stand-alone unit to be easily operated, the processing system 1, in particular the housing 2, comprises a connection system 16 for connecting the processing system 1, in particular the single area, to a superordinate network 17, in particular an internet, where the connection system 16 is designed for transmitting and receiving data 18 (schematically represented by an arrow), as shown schematically in FIG. 2. The connection system 16 is designed for manual or automatic connection from the processing unit 1 or processing system 1, respectively, or from an external component 19, such as a computer; establishment of a connection via the connection system 16 can be activated automatically or is possible, respectively. The connection system 16 may also be integrated into the control unit 4 or the communication system 7.

The connection to the superordinate network 17 can be wireless via radio 20 or via a cable 21, in particular via network or telephone cables or fibre-optic cable, for example those of a shop 22 or department store 22. In particular, it is possible that a so-called internet stick or data stick is used. For this purpose, it is advantageous if the connecting system 16 cooperates with the communication system 7, as the internet stick can be easily plugged into the computer, in particular a USB interface, of the communication system 7. If the processing system 1 is provided with the connection system 16, it is assigned an identification number of its own, in particular an IP number, so that the processing unit 1 can be addressed directly. It is also possible that in the shop 22 or department store 22 a plurality of processing systems 1 are installed, which are interconnected via a cable 23, in particular a network cable 23, wherein only a single processing system 1 is equipped with the connection system 16, via which the further processing systems 1 can also be activated and controlled. Preferably, the internal data exchange takes place via the communication system 7 of each processing system 1.

Use of the connection system 16 ensures that the processing system 1 can transmit data or receive external data. This also allows remote maintenance, e.g. via the external component 19, to be carried out, as via the data link all data or systems can be accessed. It is particularly advantageous that software updates are sent via the superordinate network 17, so that all processing systems 1 in use can be kept at a consistent level. Thus, software errors or malfunctions can be resolved very quickly by such updates.

Figure 3:
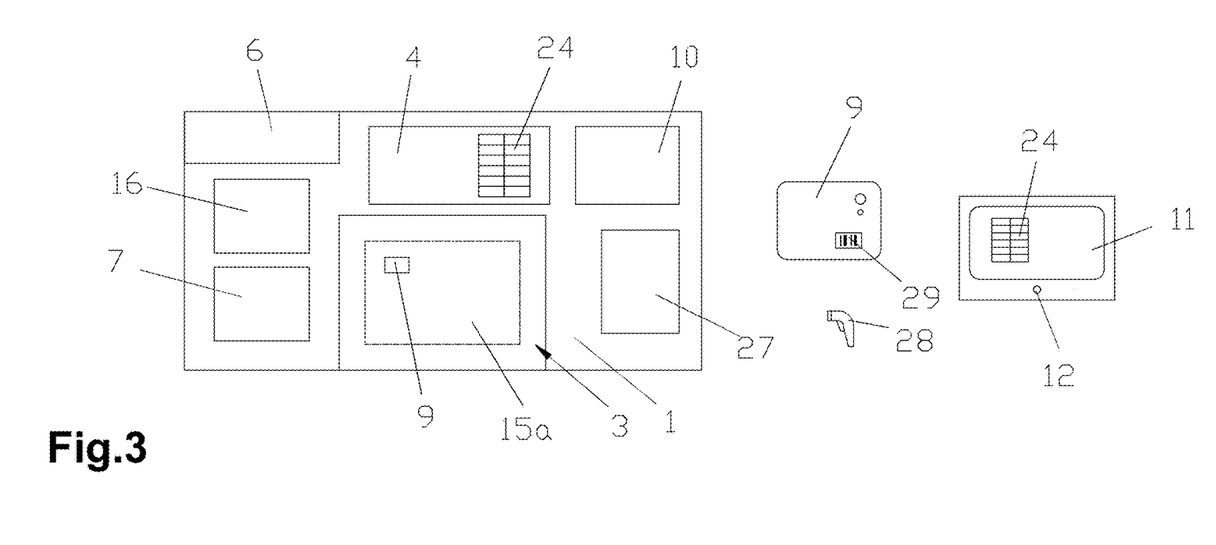
FIG. 3 a schematic representation of a processing system with additional components, in particular for detecting a workpiece.
Figure 4:
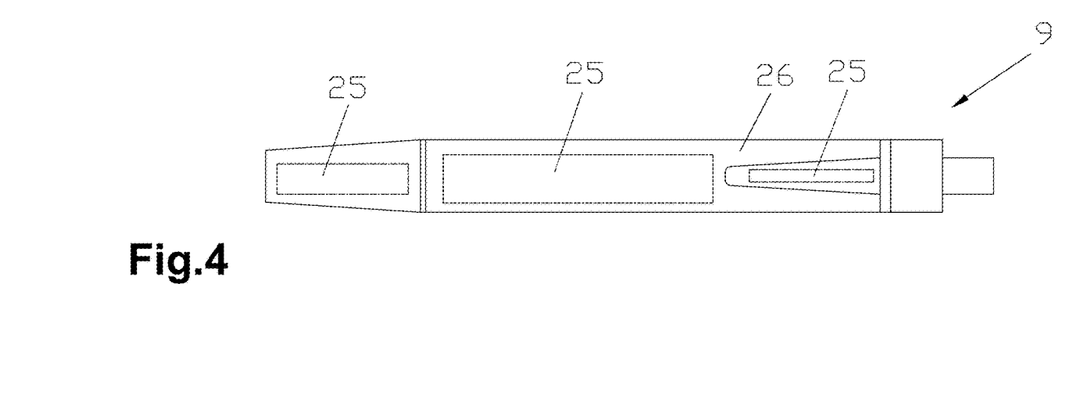
FIG. 4 a workpiece in simplified, schematic representation with several processing areas.

Moreover, it is possible that the processing system 1 is equipped with a database 24, i.e., in the input area, particularly at the display element 11, and/or the control area 4, a database 24 is integrated, in which the data of the workpieces to be processed 9 are stored, as shown schematically in FIG. 3. Thus, it is possible that during the creation of a processing operation, in particular of an engraving process, the user selects the workpiece 9 from the database 24, so that all the data for that workpiece 9 can be automatically loaded. The data include, for example, the workpiece name or type, a graphic illustration of the workpiece 9, the length, width and height of the workpiece 9, etc. Furthermore, for the differently stored workpieces 9 at least one or several processing areas 25 and engraving areas 25 are stored, so that the user can specifically enable the stored engraving areas 25 and populate them with appropriate texts or graphics, as shown in FIG. 4 for a workpiece 9 in the form of a ball pen 26. In particular, by establishing specific processing areas 25 the workpieces 9 can be prevented from being inadvertently destroyed, i.e., e.g., in case of engraving a smartphone on the rear of the same at various points the camera for taking photos and the company logos or labels are arranged, so in these areas no engraving must be done, since otherwise the optics or the transparent protective film or protective layer or the label, respectively, would be destroyed by the laser engraving. Thus, it is an important advantage if the novel processing systems 1 are equipped with such a database 24 for storing workpieces 9, wherein for the workpieces 9 at least a processing area 25 is defined. Here, as much information or data as possible, e.g. the workpiece 9 or type designation, the graphic representation, the length, width and height of the workpiece 9, the material of the workpiece 9 and the material range for differently used materials, as well as at least one processing area 25, in particular an engraving area, as well as a starting or zero and/or reference point for the processing unit 1, in particular the laser plotter 15, etc., are stored.

The registration of the products, in particular of the workpieces 9, is preferably carried out by the manufacturer or owner of the processing system 1 itself, where the updating of the database 24 takes place via the connecting system 16, i.e., whenever a user wants to edit a new product or workpiece 9 for the first time, or whenever a new product or workpiece 9 is launched on the market, this product is sent to the headquarters or to the manufacturer, who then collects all data of the product processes in such a matter that they can then be integrated into the database 24 and are available for the selection. This is advantageous, since it must be ensured upon first use of a new product which areas may be processed and which not.

Basically, however, it would be possible to enter and save new products directly by appropriate input on site, so that they are available again later. It would also be conceivable that after storage the data are transmitted to the manufacturer or headquarters for control and revision, so that subsequently the product is updated also for other processing systems 1 in other stores 22, and these data are updated via their connecting systems 16. In case of such a procedure, it is advantageous that immediate processing of the new product can be carried out by the user on site, so the user does not have to wait until the data are imported into the database 24, where then, however, a detailed revision and comprehension of the stored data for the product are performed by the manufacturer or owner.

Furthermore, it is possible that the input device or the display element 11b is equipped with a connection system 16, as is shown schematically in FIG. 2. Thereby, it is made possible that the display element 11b can be used physically separated from the location of the processing apparatus 1 or the processing system 1. As shown in FIG. 2, thus a processing system 1 can be operated in a shop 22a with an associated display element 11a, where in another, preferably adjacent shop 22b, the display element 11b is operated or operable, so that the customers in store 22b create appropriate processing operations via the operating software using the display element 11b. After completion of the input on the display element 11b, the coupling button 12 on the display element 11b is actuated, so that now connection to the nearest processing system 1, in particular with the shop 22a, is established via the integrated connection system 16, and the data are transmitted for processing. An operator at the installation site of the processing system 1 can now insert the workpiece 9, so that the processing operation can be carried out, and the user can collect the finished workpiece 9 from the other shop 22b. To inform the user when his/her workpiece 9 is completed, after connection set-up a time for picking up the workpiece is displayed on the display element 11b. Here processing operations already stored are also taken into account, so that the customer is shown as realistic a time as possible as to when the work piece 9 is going to be completed. To ensure a fast execution process during such an operation, before, during or after the data transfer from the display element 11b from the shop 22b without processing system 1 an order message to an operator of the store 22a with the processing system 1 is created and sent. This order message can, for example, comprise activation of a pager and/or an SMS and/or an email to a cell phone or computer and/or activation of an info light on the processing system 1, so that the operator can see immediately that an external processing operation has been received. It is also possible that the order message comprises and displays all information, so that the operator can insert the corresponding workpiece 9. However, it is also possible that when activating the external processing job the operator is shown all data on the processing system 1, or can see the input on the display element 11a belonging to the processing unit or system 1. Such approaches are beneficial for smaller shops 22b, where there is little room for setting up the stand-alone device.

In such an embodiment, in which a display element 11 is additionally operated in another shop 22 or store 22, respectively, that the display element 11 is equipped with a connection system 16 for exchanging data with a further connection system 16 in the processing system 1, wherein the location-independent display element 11 automatically proposes or selects the connection to the nearest processing system. Here a selection list of the nearby processing systems 1 is accessible or displayed, respectively, in the operating software, where the degree of utilisation and processing time for performing a processing operation and/or the distance to the location of the display element 11 are shown. Thus, the customer can see how long it will take at which location until his/her product is completed. The customer can choose from the selection list the processing system 1 best suited for him/her, so that subsequently the data are sent to this. It is furthermore possible that in addition to the display of the distance to the location of the display element 11 and the processing time or degree of utilisation a description of the route to the processing system 1 selected from the list is displayed and can be printed out via the communication system 7.

To simplify the selection of the product or workpiece 9 to be processed, it is also possible that a reading system 27 is integrated into the processing system 1 or on the display element 11. The reading system 27 comprises, e.g., a bar code scanner 28, a QR scanner, a laser scanner, etc., or software in the form of a corresponding app on the display element 11, where the scanner 28 is a handheld device or integrated into the housing 2. The user thus only needs to scan or record (not shown) the code 29, in particular bar code or QR code, attached to the workpiece 9 or product with the reading system 27, in particular the scanner 28 or a camera on the display element 11, whereupon a workpiece identification is performed based on the detected code 29, as the code 29 for the respective workpiece 9 is stored in the database 24. The operating software then accesses the corresponding product or workpiece 9 and is then updated with the data of the workpiece 9, so that the users only has to enter the text or graphics into the processing areas 25. For this purpose, it is possible that a graphical representation of the product is shown in the operating software, where the stored processing areas 25 are marked accordingly.

However, the processing system 1 can also be designed in such a manner that the control area 4 and/or input area 4a is/are designed for automatic identification of the workpiece 9 stored in the database 24 by detection of the inserted workpiece 9. This can be done by automatic identification of the workpiece 9 by determination of the length, width and height of the workpiece 9, so that using the stored data for the workpiece 9 a corresponding evaluation is performed. The system is preferably used in such a manner that in the operating software the user selects a product group, such as smart phone, tablet PC, smart phone cases, etc., so that based on the determination of the length, width and height of the workpiece 9 now using the various dimensions the manufacturer, the workpiece 9 or product and type are easily detectable or detected and the data can be loaded, i.e. by specifying a product group the range to be selected from is reduced in the database, so that maximally accurate detection of the product is possible. The detection can be carried out, for example, by measurement in the processing area 3 or a scan of the product.

It is also possible that for automatic identification of the workpiece 9 a camera is provided for imaging of the processing area 9 or the work piece 9, i.e., e.g., the camera (not shown) associated with the processing area 3 takes an image of the inserted workpiece 9, which is then compared with the stored graphic images for the individual workpieces 9, and thus a corresponding evaluation is made. A further possibility is that the display element 11 comprises a camera (not shown), whereby the user takes an image of the product or work piece 9, which is then compared with the stored images. Preferably, multiple images of the products, in particular all views, are stored in the database 24.

If in the automatic identification of the workpiece 9 or the type of the product, respectively, no clear assignment of the products should be possible, the user is presented a list of the closest or most plausible products stored, so that the user can then select the appropriate product. It is also possible that despite installed automatic detection or without this the user selects the product or the workpiece 9 manually, where again preferably only those products of a product group are shown to be the user that the user chooses, so the choice of the products is simplified, which means that the user first selects a product group, such as smart phone, tablet PC, stamp, etc., whereupon only those products are displayed that are assigned to these categories. Thus, the number of products to be selected can be reduced in a user-friendly manner. For this purpose, it is also possible that a plurality of such gradations of groups is possible in order to reduce the number of products as far as possible and thus increase user-friendliness. These groups are saved for the products in the database 24, and it is possible that multiple group definitions can be stored for one product, so that this product will be displayed in different groups on the list.

It is also possible that the database 24 is edited by the operator or salesperson to make an appropriate adaptation for the shop 22 or department store 22, in particular the product range. For this, the operator or salesperson can access the individual workpieces 9 and enable or disable them, i.e. the operator or salesperson adapts the workpieces 9 accessible in the database 24 to the sales assortment of the store 22, so that only those workpieces 9 can be accessed that are actually to be sold. Of course, this can also be done via the code 29 of the workpieces 9, for which purpose e.g. only the code 29 of the items to be sold, especially the workpieces 9, is scanned, so that then only the scanned workpieces 9 are accessible. Here it is possible that for this purpose a corresponding learning mode is activated, during which the product range is entered.

To update one or all operative processing systems 1, it is also possible that a newly registered product, in particular the data for the same, are uploaded to a cloud 29 by the manufacturer, after which the individual processing system 1 automatically updates the database 24 at defined times. Of course, it is also possible to store updates for the operating system or other software updates or data in the cloud 29, to be retrieved by the processing systems 1 automatically or manually. Such cloud storage 29 has the advantage that at any desired time data, software, etc. can be uploaded and are then accessible at any time. Thus, on the individual continents updates can be performed when the shop 22 or department store 22 is not open to the public, so as not to interfere with the operation of the system.

It is also possible that warehouse management is integrated into the database 24, so that for the workpieces 9 correspondingly purchasable in the shop 22, in particular the stamp plate blanks 9 and/or the stamps for this or the accessories, etc., the inventory, i.e. the number of available quantities of the product, is registered, which is reduced after a corresponding processing operation for this product. If in doing so some defined inventory level is reached or undercut, the processing system 1 initiates an order for goods. To this end, an order for goods can be sent directly via the connection system 16 to the manufacturer or supplier via the superordinate network 17, in particular the internet, or the required order for goods is shown on the display element 11 or on the processing system 1, so that the operator or salesperson can activate and send the same. This warehouse management can in turn be enabled or disabled for the differently stored workpieces 9 in the database 24. For this purpose, it is also possible that arbitrary ordering addresses can be stored for the individual workpieces 9.

As a matter of form, it should finally be emphasised that, for the better understanding of the structure of the system 1 and its components and their constituent parts, the same have in part been represented not to scale and/or enlarged and/or reduced in size.

In addition, individual features or feature combinations from the various exemplary embodiments shown and described can inherently form independent inventive solutions or solutions according to the invention.

The invention claimed is:

1. A processing system, comprising at least one processing area, one control area), and one input area, wherein via an input and/or display element a user enters a text and/or graphics in an operating software installed therein, which text and/or graphics are passed to a control software running in the control area, wherein into the input area and/or the control area a database is integrated, in which data of the blanks or workpieces to be processed are stored, wherein the control area and/or the input area are designed for the automatic identification of the workpiece stored in the database by detection of the workpiece.

2. The processing system of claim 1, wherein the workpiece or the blank is selected from the database via the operating software or loaded into the operating software.

3. The processing system of claim 1, wherein the automatic identification of the workpiece is done by detection of the length, width and height of the workpiece.

4. The processing system of claim 1, wherein for automatic identification of the workpiece a camera for imaging of the processing area or the workpiece is provided.

5. The processing system of claim 1, wherein for the differently stored workpieces at least one or several processing areas are defined and stored, which are selectable via the operating software.

6. A processing system, comprising at least one processing area, one control area, and one input area, wherein via an input and/or display element a user enters a text and/or graphics in an operating software installed therein, which text and/or graphics can is passed to a control software running in the control area, wherein a connection system for connecting the processing system, in particular the individual areas, to a superordinate network, in particular an internet, is provided, where the connection system is configured for transmitting and receiving data, wherein in the input area and/or the control area a database is integrated in which the data of the workpieces or blanks are stored, wherein the processing system comprises an identification number, in particular an IP number, and the individual workpieces are available from the database in the input area and/or the control area and is activated or deactivated.

7. The processing system of claim 6, wherein the connection system is designed for transmitting and receiving data, in particular of workpiece data, software updates, etc.

8. The processing system of claim 6, wherein the connection system is integrated into the communication system.

9. A processing system, comprising at least one processing area, one control area, and one input area, wherein via an input and/or display element a user enters a text and/or graphics in an operating software installed therein, which text and/or graphics is passed to a control software running in the control area, where a reading system for detecting a code is provided, wherein on the display element, the reading system is integrated, wherein the reading system for identification of the workpiece via a code attached to the workpiece is integrated, and the data stored for this workpiece are accessible via an operating software on an input device or display element.

10. The processing system of claim 9, wherein the code is formed by a bar code or QR code.

11. The processing system of claim 9, wherein the detection of the code via a scanner or camera on the input or display element, respectively, is, respectively, carried out by an app installed thereon.

12. A processing system comprising at least one processing area, one control area, and one input area, wherein via an input and/or display element a user can enters a text and/or graphics in an operating software installed therein, which text and/or graphics is passed to a control software running in the control area, wherein the display element is equipped with a connection system for exchanging data with a further connection system in the processing system, wherein the location-independent display element automatically suggests or selects, respectively, the connection with the nearest processing system, wherein in the operating software a selection list of the nearby processing systems is available or represented, whereby the degree of utilisation or the processing time for the execution of a processing operation, respectively, and the distance to the location of the display element are illustrated.

13. The processing system of claim 12, wherein in addition to the display of the distance to the location of the display element and the processing time or utilisation directions to the processing system selected from the selection list are displayed and is printed out via the communication system.

14. A method of operating a processing system, comprising: creating, on an input device or display element, a desired processing operation via an operating software; passing the processing operation to a control device, in particular to a control software, and converted by the same in such a manner that control of a processing unit is carried out for performing the desired processing operation; establishing via a connecting system a connection of the processing system, in particular the individual area, to a superordinate network, in particular an internet, for transmitting and receiving data, wherein in the processing system, in particular in an input area and/or the control area, a database is run, in which data of the blanks or workpieces to be processed are stored; performing an automatic identification of the workpiece stored in the database by detection of the workpiece using the control area and/or the input area.

15. The method of claim 14, further comprising identifying the workpiece using a reading system; detecting a code attached to the workpiece using the reading system; and loading the data stored for this workpiece into the operating software on the input device or display element, respectively.

16. A method of operating a processing system, comprising: creating, on an input device or display element, a desired processing operation via an operating software; passing the processing operation to a control device, in particular to a control software, and converted by the same in such a manner that a control of a processing unit is carried out for performing the desired processing operation, where the data transmission from the operating software to the control software takes place at the input and/or display element via a superordinate network, in particular via an internet connection; and selecting, using the location-independent display element, the connection with the nearest processing system, wherein a selection list of the nearby processing systems and the degree of utilisation and processing time for performing a processing operation and/or the distance to the location of the display element are shown in the operating software.

17. Method according to claim 16, further comprising displaying a time of completion of the product or workpiece for picking up in the operating software during or after the data transmission.

18. The processing system of claim 1, further comprising one receiving area and/or one presentation area.

19. The processing system of claim 6, further comprising one receiving area and/or one presentation area.

20. The processing system of claim 9, further comprising one receiving area and/or one presentation area.

21. The processing system of claim 12, further comprising one receiving area and/or one presentation area.

* * * * *